No. 664,305. Patented Dec. 18, 1900.
J. WILLISON.
COUPLING FOR RAILWAY CARRIAGES.
(Application filed July 10, 1900.)
(No Model.) 8 Sheets—Sheet 1.
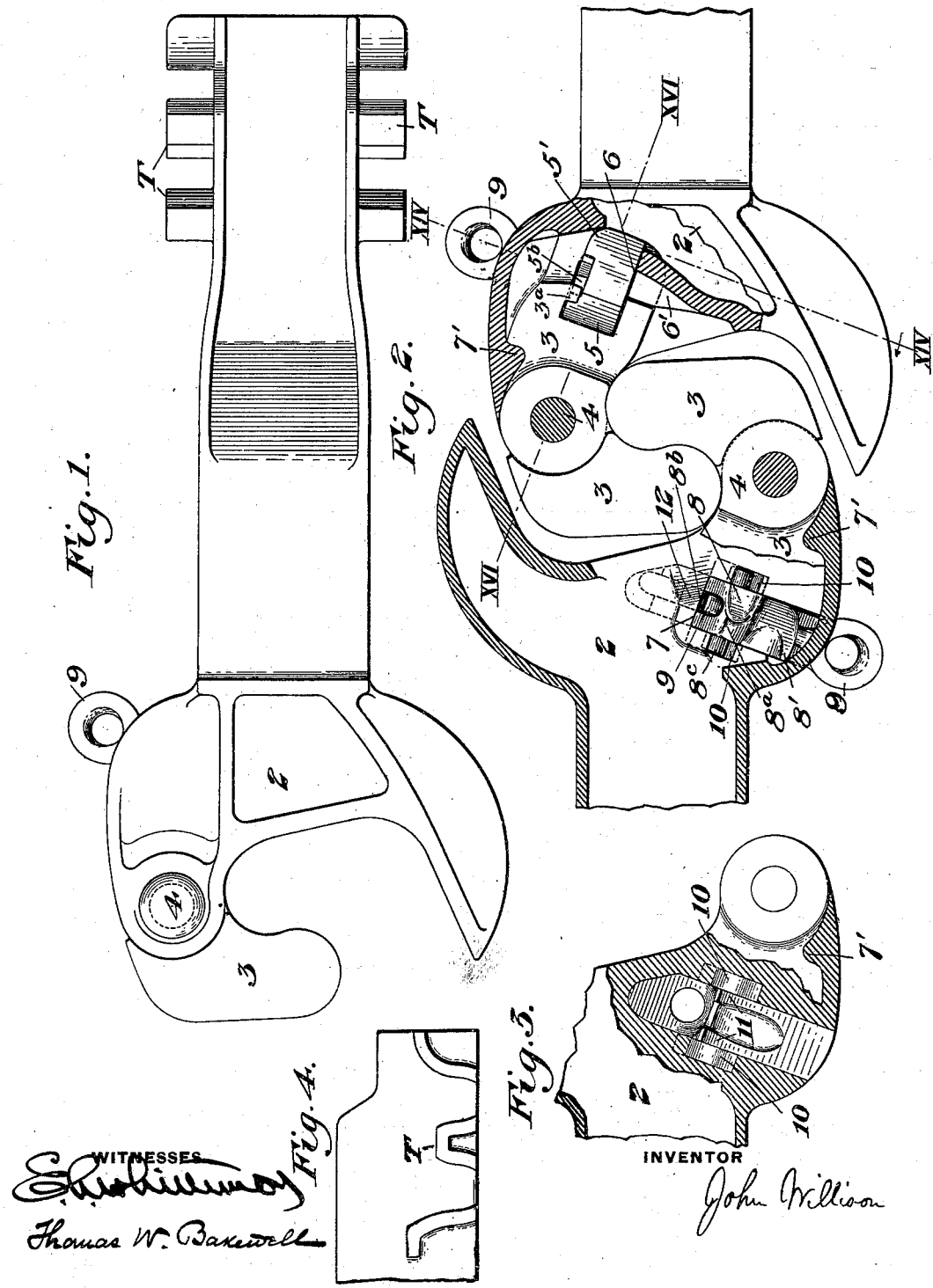
WITNESSES
Thomas W. Bakewell
INVENTOR
John Willison No. 664,305. Patented Dec. 18, 1900.
J. WILLISON.
COUPLING FOR RAILWAY CARRIAGES.
(Application filed July 10, 1900.)
(No Model.) 8 Sheets—Sheet 2.
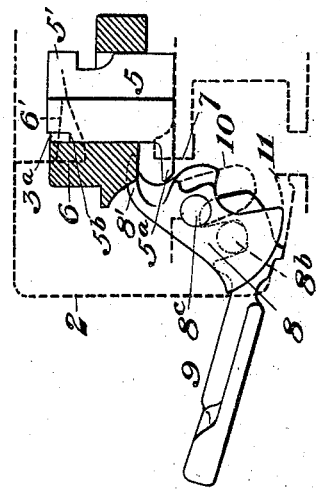
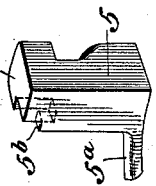
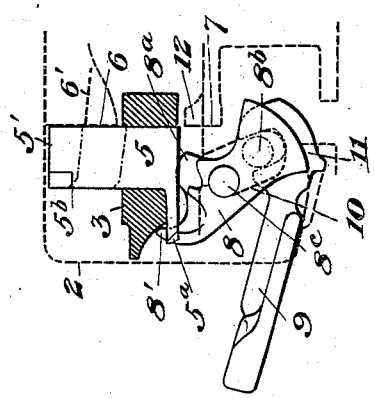
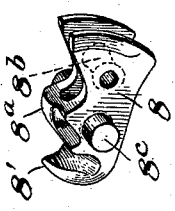
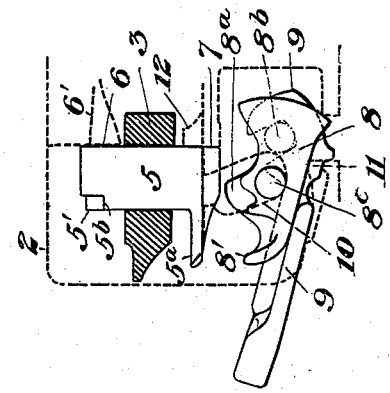
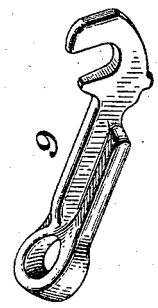
WITNESSES
INVENTOR
John Willison
by Bakewell & Bakewell
his Attorneys.
THE NORRIS PETERS CO., PHOTO-LITHO., WASHINGTON, D. C.

No. 664,305. Patented Dec. 18, 1900.
J. WILLISON.
COUPLING FOR RAILWAY CARRIAGES.
(Application filed July 10, 1900.)
(No Model.) 8 Sheets—Sheet 3.
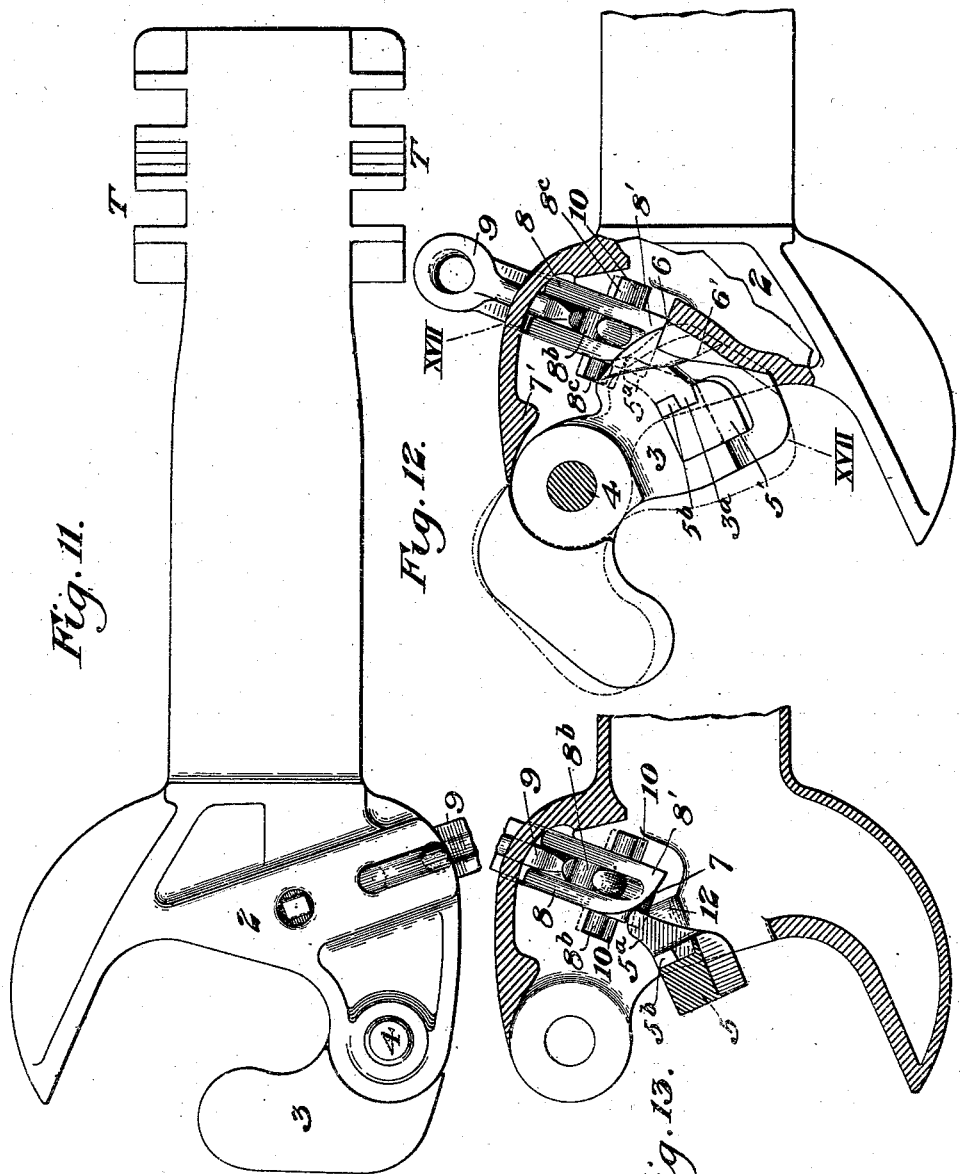

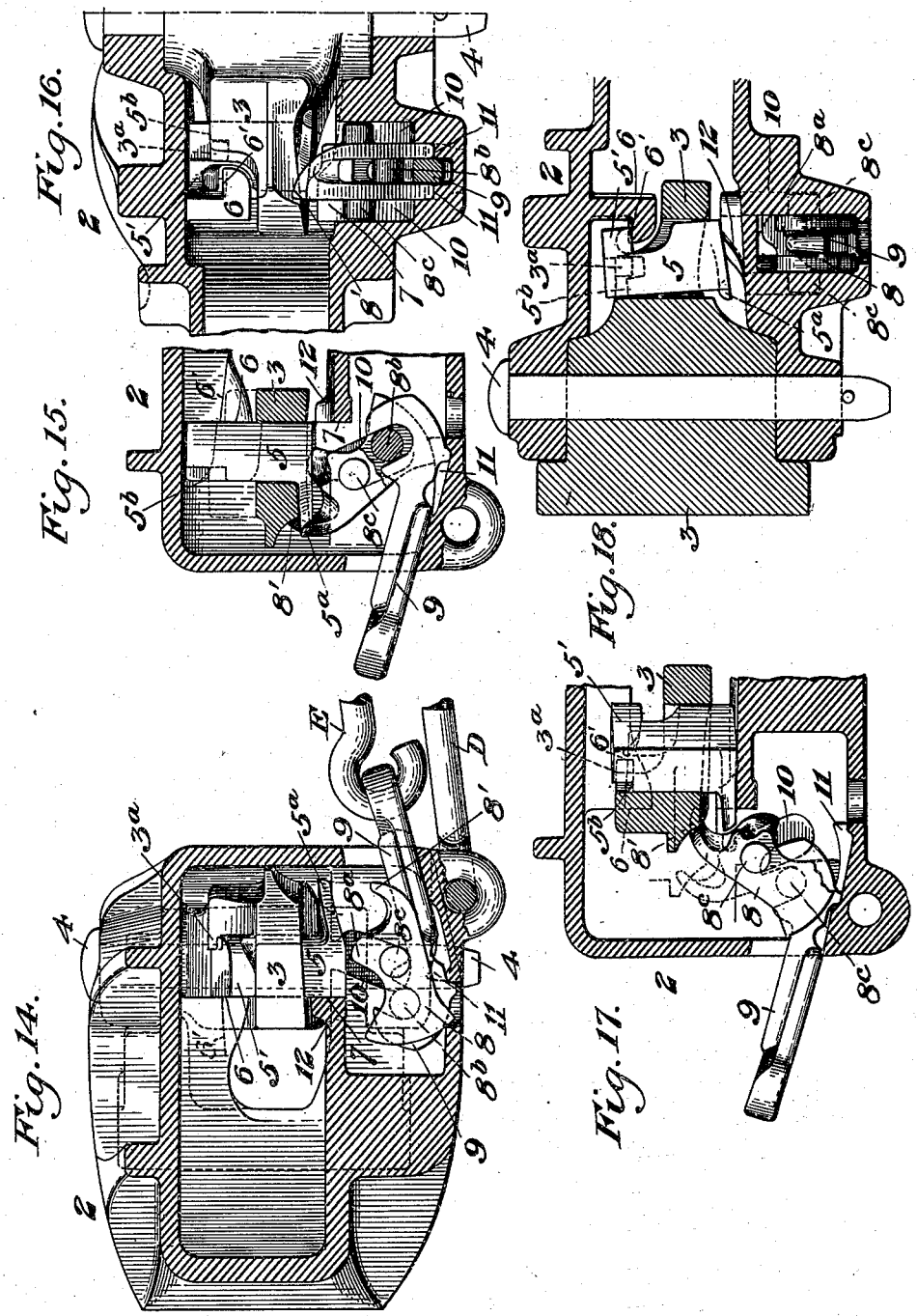

No. 664,305. Patented Dec. 18, 1900.
J. WILLISON.
COUPLING FOR RAILWAY CARRIAGES.
(Application filed July 10, 1900.)
(No Model.) 8 Sheets—Sheet 5.
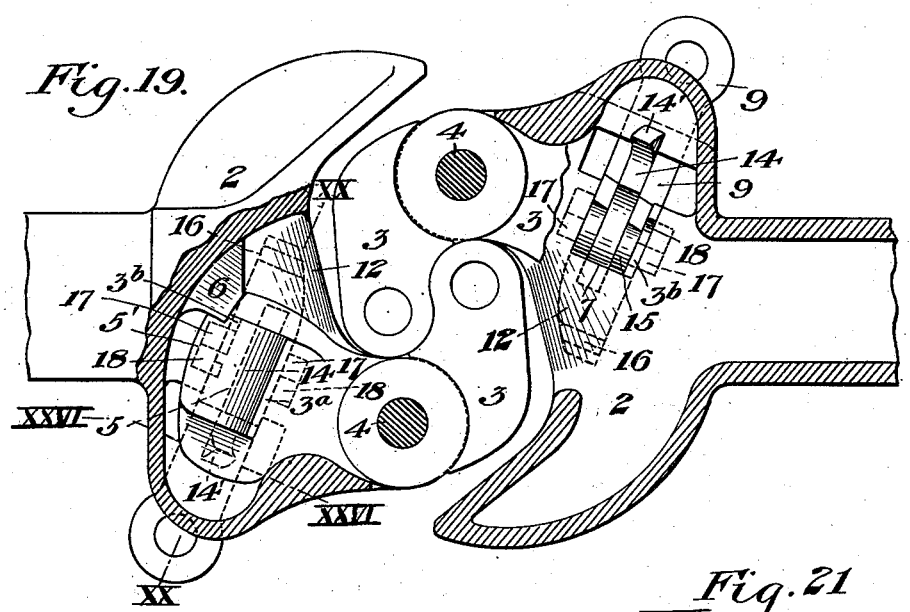
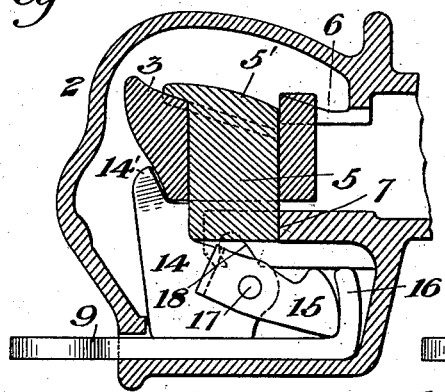
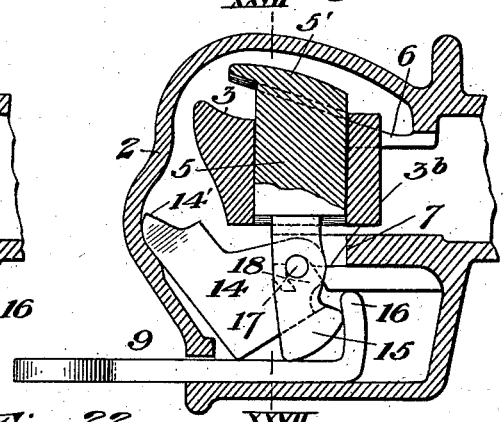
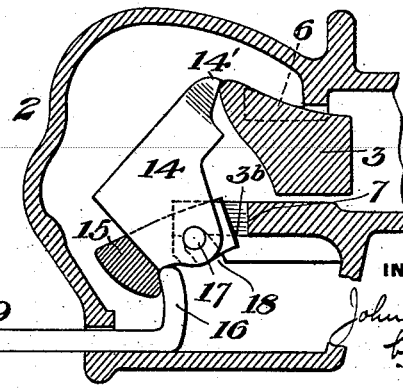
WITNESSES
INVENTOR
John Willison
by Bakewell & Bakewell
his Attorneys.

No. 664,305. Patented Dec. 18, 1900.
J. WILLISON.
COUPLING FOR RAILWAY CARRIAGES.
(Application filed July 10, 1900.)

(No Model.) 8 Sheets—Sheet 6.

No. 664,305. Patented Dec. 18, 1900.
J. WILLISON.
COUPLING FOR RAILWAY CARRIAGES.
(Application filed July 10, 1900.)
(No Model.) 8 Sheets—Sheet 7.
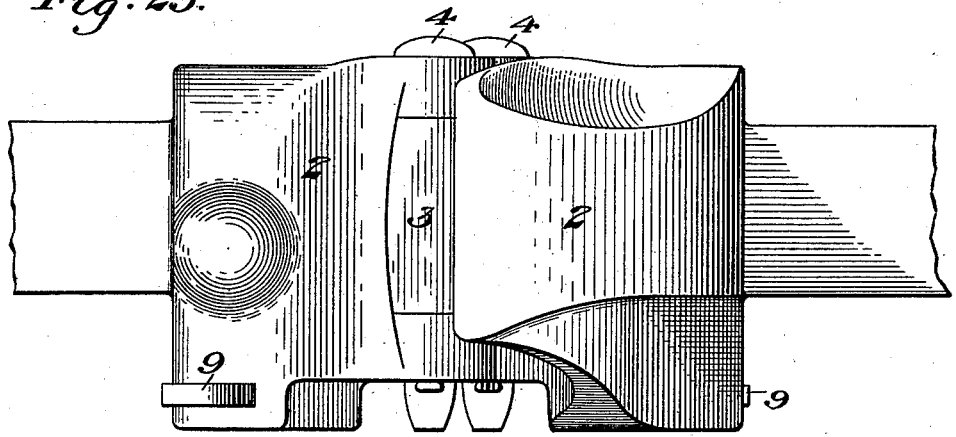
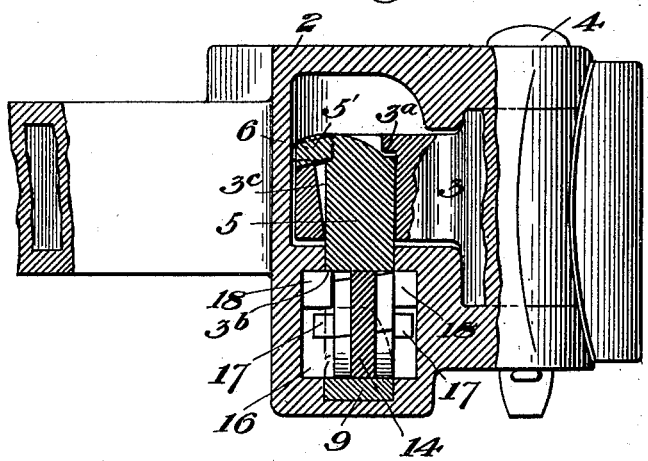
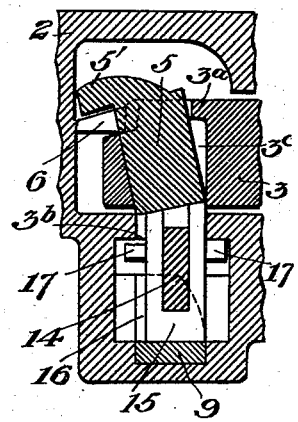
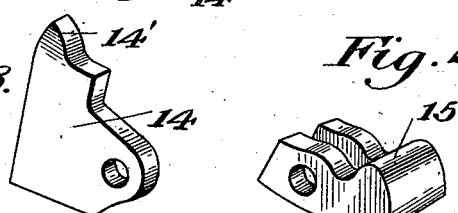
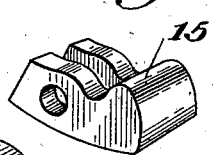
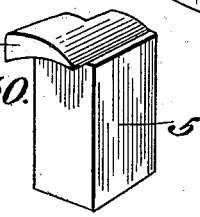
WITNESSES INVENTOR
John Willison
by his Attorneys
Bakewell & Bakewell
THE NORRIS PETERS CO., PHOTO-LITHO., WASHINGTON, D. C.

No. 664,305. Patented Dec. 18, 1900.
J. WILLISON.
COUPLING FOR RAILWAY CARRIAGES.
(Application filed July 10, 1900.)
(No Model.) 8 Sheets—Sheet 8.

WITNESSES

INVENTOR
John Willison
by Bakewell & Bakewell
his Attorneys.

THE NORRIS PETERS CO., PHOTO-LITHO., WASHINGTON, D. C.

UNITED STATES PATENT OFFICE.

JOHN WILLISON, OF CLEVELAND, OHIO, ASSIGNOR TO THE NATIONAL MALLEABLE CASTINGS COMPANY, OF SAME PLACE.

COUPLING FOR RAILWAY-CARRIAGES.

SPECIFICATION forming part of Letters Patent No. 664,305, dated December 18, 1900.

Application filed July 10, 1900. Serial No. 23,111. (No model.)

*To all whom it may concern:*

Be it known that I, JOHN WILLISON, of Cleveland, in the county of Cuyahoga and State of Ohio, have invented a new and useful Improvement in Couplings for Railway-Carriages, of which the following is a full, clear, and exact description, reference being had to the accompanying drawings, forming part of this specification, in which—

Figure 23:
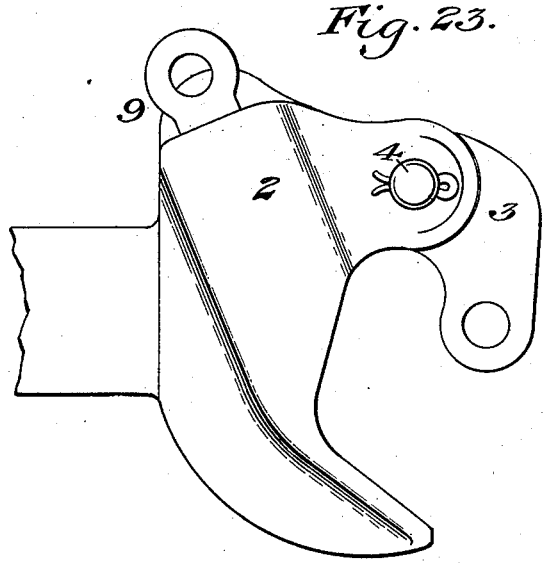
Figure 24:
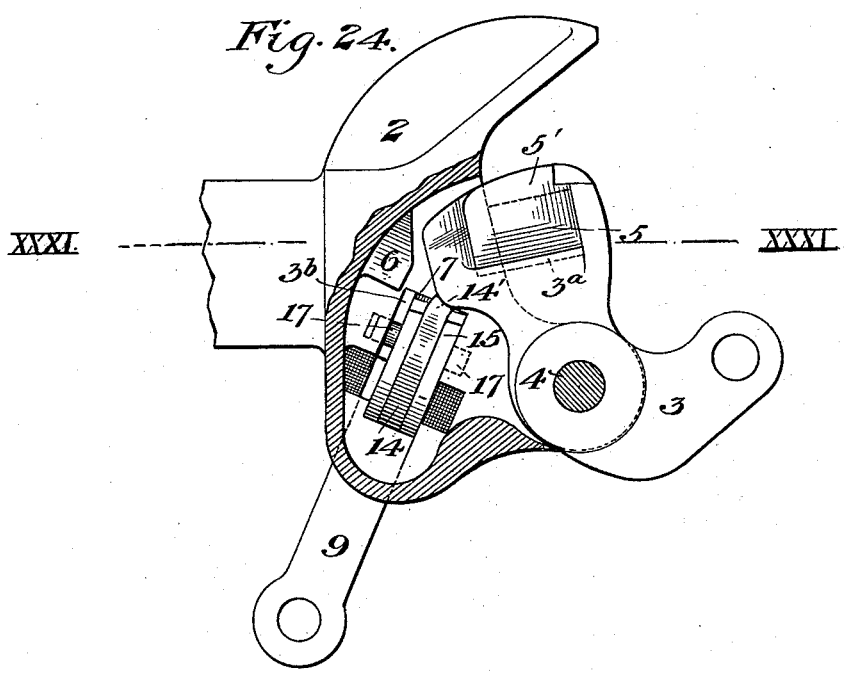
Figure 31:
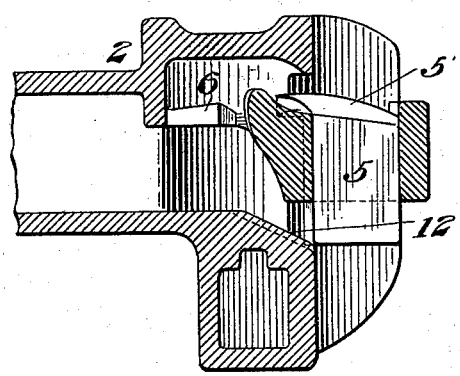
Figure 32:
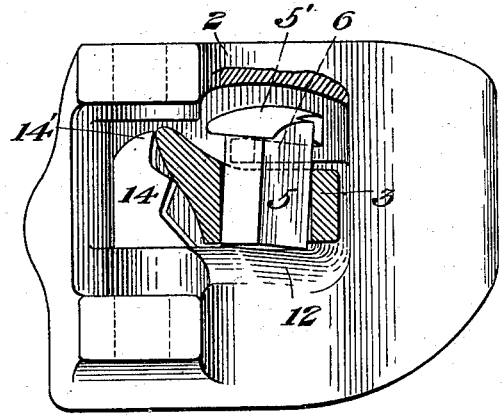

Figure 1 is a top plan view of my coupler. Fig. 2 is a horizontal section of two of the couplers coupled together, the knuckles being locked. Fig. 3 is a sectional detail view, the floor of the coupler being broken away for better illustration. Fig. 4 is a side view of the end portion of the draw-bar shank. Figs. 5, 6, and 7 are cross-sectional views showing in diagram the successive positions of the parts of the coupler—namely, the locked position, the lock-set position, and the open position. Figs. 8, 9, and 10 are perspective views of parts of the coupler. Fig. 11 is a bottom plan of the coupler. Fig. 12 is a top plan view, the coupler-head being partly broken away and the knuckle being unlocked and open. The dotted lines show the extreme open position of the knuckle and the full lines show the position at which the knuckle engages the lever at its rearward motion. Fig. 13 is a horizontal sectional detail view showing the tail of the lock and the lever for throwing the knuckle. Fig. 14 is a vertical cross-section on the line XIV XIV of Fig. 2, showing the knuckle locked. Fig. 15 is a vertical sectional detail view showing the lock upheld and set in unlocked position. Fig. 16 is a vertical section on the line XVI XVI of Fig. 2, showing the lock resting on the lever by which the knuckle is opened. Fig. 17 is a vertical section on the line XVII XVII of Fig. 12, showing by full lines the knuckle thrown to its open position. Fig. 18 is a vertical section showing the lock in the position to which it is raised by the knuckle on the floor of the coupler and showing its head carried by the ledge on the coupler. Fig. 19 is a horizontal sectional plan view of two interlocked couplers embodying a modification of my invention. Figs. 20, 21, and 22 are vertical cross-sections on the line XX XX of Fig. 19, showing the coupler respectively in its locked position in the intermediate position in which the knuckle is unlocked and the lock set in unlocked position, but the knuckle not yet thrown open. Fig. 23 is a bottom plan view of the coupler of Fig. 19. Fig. 24 is a top plan view, partly in section, showing the knuckle thrown open. Fig. 25 is a side elevation of the couplers shown in Fig. 19. Fig. 26 is a sectional elevation of the couplers broken away, the section-plane being on the line XXVI XXVI of Fig. 19. Fig. 27 is a detail sectional view showing the lock in the same position as in Fig. 21, the section being on the line XXVII XXVII of Fig. 21. Figs. 28, 29, and 30 are detail views of parts. Fig. 31 is a longitudinal section on the line XXXI-XXXI of Fig. 24. Fig. 32 is a front view, partly broken away, showing the lock lifted by the incline on the floor of the coupler-head.

In the drawings, 2 represents the coupler-head, having a knuckle 3, pivoted on a pin 4 and adapted to swing thereon. The lock 5 is a sliding block which is carried in a vertical hole in the tail of the knuckle and projects above and below the same, so that when the knuckle is locked a head 5' at the upper end of the lock will fit behind a stop-shoulder 6 at the end of a ledge or shelf 6' at the upper part of the coupler-head, while the lower end of the lock will fit behind a stop-shoulder 7, preferably constituted by forming a recess in the floor of the coupler. I prefer to form on the rear side of the knuckle a hook portion, which engages a shoulder 7' on the inner side of the coupler-head. It retains the knuckle in place when the coupler is locked, even if the pivot-pin should be lost.

The device for actuating the lock and opening the knuckle comprises a knuckle-throwing lever 8 and a sliding rod or block 9, which preferably projects into the coupler-head at an angle to the horizontal, the floor of the coupler-head being inclined for that purpose. The lever 8 has a nose 8' and a shoulder $8^a$ and is connected to the rod 9 by a hook on the rod which engages a pin $8^b$ at the lower end of the lever, which is forked to permit such engagement. The lever is not pivoted to the coupler-head by a fixed pivot, but has trunnions $8^c$, which fit in inclined guides or grooves 10, formed in the coupler-head. When the coupler is locked, the lever 8 rests upon the sliding rod 9 in an approximately horizontal position, as shown in Fig. 14, and to insure greater compactness and strength I prefer to groove the back of the lever and to form a longitudinal rib on the surface of the sliding rod 9, which fits in the groove when the lever is in its horizontal position. When the rod 9 is drawn outwardly, it draws with it the lower end of the lever, causing the trunnions $8^c$ to move in the inclined guides 10 until the lower forked end of the lever has been drawn to the top of ledges 11 on the floor of the coupler, whereupon the lever will turn into the nearly upright position shown in Fig. 15 (the lock-setting position) and will rest upon said ledges. If then the motion is continued farther, the trunnions will reach the end of the guides 10, and the lever will then be tipped forwardly into the position shown in Fig. 17. When the knuckle is locked, as in Fig. 14, it is within the coupler-head, and the lock 5 projecting above and below it engages the stop-shoulders 6 and 7. If it be desired to unlock and open the knuckle, the trainman pulls the rod 9 outwardly, and thus moves the lever 8, as above described, causing it to rise in the guides 10 and bringing its shoulder $8^a$ into contact with the end of the lock 5, thereby raising the same and lifting the head 5 of the lock above the stop-shoulder 6 and lifting the foot of the lock above the lower stop-shoulder 7. Further motion of the sliding rod, as above explained, will tip the lever, bringing its nose against the rear of the tail of the knuckle and throwing it into open position, as shown in Fig. 17. The lock 5 after passing beyond the ledge 6' rides upon and is supported by the floor of the coupler, and in order to facilitate such supporting of the lock I prefer to provide at its lower end a rearwardly-projecting tail $5^a$, which is adapted to be carried by the shoulder $8^a$ and to make contact with the floor of the coupler when the knuckle is moving outwardly. When the knuckle is next moved back, either by hand or in the act of coupling with another car, the tail $5^a$ of the lock engages an inclined surface 12 on the floor of the coupler and is raised thereby, so as to cause its head to pass above the ledge 6', as shown in Fig. 12, and when the lock reaches the end of the ledge it will drop vertically behind the same into engagement with the shoulders 6 7 and will lock the coupler automatically. The rearward motion of the knuckle just described will also cause its tail to engage a portion of the shoulder $8^a$ of the lever 8 and will move the same, together with the sliding rod 9, back into the approximately horizontal position shown in Fig. 14.

If instead of throwing the knuckle fully open, as just described, it be desired simply to free the lock from its stop-shoulders and to set it in unlocked position, as is frequently desirable when the knuckle is coupled with the knuckle of another car, the trainman draws outwardly the sliding rod 9, and thereby moves the lever 8 into the nearly upright position shown in Fig. 15, at which time the lock will have been raised by the shoulder $8^a$ and the lever will be supported by the ledges 11. The lock having thus been raised and propped by the lever 8 in unlocked position may be allowed to remain in such position, the lever 8 being supported vertically by the ledges 11 and laterally by the inclined grooves engaging with the trunnions $8^c$. If the coupler is engaged with the coupler of another car, the knuckle will be drawn open when the cars are next separated. If, however, it is desired to relock the coupler without separating the cars, the trainman without having to go between the cars can push the sliding rod 9 inward, whereupon the lever 8 will be moved back toward the horizontal position shown in Fig. 14, and the lock being thus released will drop behind the shoulders 6 7 into locked position.

If after the lock has been set in unlocked position the knuckle is opened by drawing the cars apart, the tail of the lock in moving outwardly will ride upon the shoulder $8^a$ of the lever 8 until it reaches the margin of the same, whereupon it will drop upon the floor of the coupler-head below the plane of the shoulder and will continue to be supported by the coupler-head during the outward motion of the knuckle. When the knuckle is next moved back into locked position, the tail of the lock will engage the lever 8 just below the shoulder $8^a$ and will push it back, so that it will drop into the approximately horizontal position shown in Fig. 14, and will thus permit the lock to drop freely back of the stop-shoulders.

In order to prevent the lock from being jarred accidentally in a vertical direction and being moved thereby out of contact with the stop-shoulders 6 7, I elongate somewhat the hole in the coupler-knuckle in which the lock is carried, so as to afford enough clearance to the lock to permit the lock to tip longitudinally therein in the direction of length of the knuckle-tail. I form in the said hole a stop or shoulder $3^a$, and when the knuckle is locked a shoulder $5^b$ on the lock fits directly beneath the same, and the lock is thus prevented from being accidentally jarred out of place. In the act of unlocking the shoulder $8^a$ the lever 8 engages the lower corner of the lock, and instead of lifting it vertically in a straight line will tip it somewhat in the hole in the knuckle, so as to clear it from the shoulder $3^a$ and leave it free to be raised. When the knuckle is next locked, the lower edge of the lock nearest the pivot-pin is the first to engage with the floor of the coupler, and this causes the lock to tip forward and its shoulder to be brought beneath the shoulder $3^a$, as above described. When the knuckle is open, the resistance afforded by the bearing of the inclined surface 12 against the foot of the lock will be sufficient to prevent the knuckle from being accidentally closed by jarring of the cars.

The shank of the coupler is preferably provided with lateral gear-teeth T, adapted to engage with the spring mechanism of the draft-rigging.

The inclining of the floor of the coupler at the place where the sliding rod 9 enters the same is desirable because said rod, being inclined somewhat in the direction of the guides or grooves 10, facilitates the ascent of the lever 8 in said grooves during the raising of the lock and its descent during the reverse motion of the parts.

In Figs. 19 to 32 I show a modification of my invention in which the knuckle-opening device comprises a knuckle-throwing lever 14, a lock-set lever 15, and a sliding rod or block 9. The piece 14 has a nose 14', and it is pivotally connected to the lock-set lever 15 by a pin 17, the ends of which serve as trunnions and fit in inclined guiding-grooves 18 in the coupler-head. The lock-set lever 15 is preferably forked at the end through which the pin 17 passes, so that the ends of the pieces 14 and 15 may interfit, and when the coupler is locked the part 15 will lie under the lock in a direction approaching the horizontal and will be engaged at the end by a hook 16 at the end of the sliding block or rod 9. It is connected with the piece 14 in such manner as to constitute therewith a toggle. When the coupler-knuckle is locked, the parts occupy the position shown in Fig. 20, the ends of the lock resting behind the shoulders 6 and 7, as above explained, and the upper corner of the lock fitting under a stop or shoulder 3ª at the top of the hole of the knuckle in which the lock is carried. By holding the lock down this shoulder prevents the lock from being jarred out of place accidentally during the motion of the car. The lower corner of the lock diagonally opposite to the shoulder 3ª rests on a shelf 3ᵇ, formed on the coupler-head, and gravity causing the lock to tip on this shelf will keep it under the shoulder 3ª. If it is desired to unlock the coupler, the trainman pulls on the rod 9, and the hook on this rod engaging the lock-set 15 draws it to the left into the position shown in Fig. 21, causing it to swing on the pin 17 until it reaches nearly an upright position. In this motion the lock-set 15 acts with the knuckle-throwing piece in the manner of a toggle, causing the piece 14 to turn on the pin 17 and also engaging and raising the lock, so as to free its head and foot from the stop-shoulders 6 and 7. During this operation the pin 17 travels along the grooves 18, and the point of contact of the lock-set 15 with the lock 5 moves in a straight line and cramping or undue friction of the parts is thus avoided. The upper end of the piece 15 is shaped so that a corner of it will first engage the lower corner of the lock below the stop or shoulder 3ª and instead of raising it vertically in a straight line will tip it somewhat in the cavity in the knuckle, so as to clear it from said shoulder and to enable it to be moved up freely in the cavity. For this purpose clearance between the lock and the knuckle at 3ᶜ is provided and the upper end of the piece 15 is inclined. When the lock has thus been raised to unlocked position, Fig. 21, it may be allowed to remain propped in such position by the lock-set, which is maintained in place by its frictional bearing against the rod or block 9 and by the bearing of the latter on the floor of the coupler-head, and if the coupler is engaged with the coupler of another car the knuckle can be drawn open when the cars are next separated. If it is desired not only to unlock the knuckle, but to throw it open in order to bring it into position where it may couple with the coupler of another car, the trainman continues to pull on the rod 9, whereupon the lock-set 15 will be drawn back into contact with the piece 14 and the latter will be tipped vertically on the axis of the trunnions 17, bringing the nose 14' into contact with the knuckle and throwing it open. When the knuckle is next moved back, either by hand or in the act of coupling with another car, the lower end of the lock engages an inclined surface 12 on the face of the coupler and is raised thereby, so as to clear and to cause its head and foot, respectively, to pass above the stop-shoulders 6 and 7, and when the knuckle has been moved back to its closed position the lock, reaching the end of the incline, drops behind the shoulders and locks the coupler automatically. The rearward motion of the knuckle also restores the parts to their original position.

The advantages of my invention will be appreciated by those skilled in the art. It is extremely simple, its parts are easy to assemble, and it is strong and durable in service. The two locking-faces on the lock engaging stop-shoulders both above and below the knuckle hold the knuckle very securely. The unlocking mechanism performs the function of throwing the knuckle or, when desired, of setting the lock in unlocked position, and it has the novel capacity of being actuated to release the lock by reverse motion of the lock-operating rod, so that the trainman can either set or release the lock-set without going between the cars. My improvement also enables me to direct the motion of the knuckle-opening device approximately in the line of travel of the knuckle-tail, and thus to avoid sliding friction and wear of the parts. This I accomplish by setting the knuckle-opening device in a substantially vertical plane and at the proper angle obliquely to the length of the draw-bar, which the construction of my improvement readily permits.

The facility which my invention affords for operating the lock by a laterally-extending rod is of advantage because it leaves the top of the coupler-head free and adapts the coupler to be used on cars where devices projecting from the top of the coupler would be objectionable. By using a suitable bell-crank lever, however, the sliding block or rod 9 may be actuated by a crank set in the usual manner above the coupler-head.

Within the scope of my invention as defined in the claims the skilled mechanic may modify the construction, since

I claim—

1. A coupler having a knuckle-lock, a lever without fixed pivot lying normally in a position approximating the horizontal under the lock, means for guiding it into an upright lock-lifting position, and means for moving the same; substantially as described.

2. A coupler having a knuckle-lock, a lever without fixed pivot lying normally under the lock, a guide for directing it into a lock-lifting position and a sliding block or rod connected with the lever and adapted to operate the same; substantially as described.

3. A coupler having a knuckle, a lock carried by the knuckle, and a lock-raising and knuckle-opening device, comprising lever mechanism set under and back of the knuckle, and means adapted to tip the same; substantially as described.

4. The combination with a knuckle, of a knuckle-opening piece set without fixed pivot and arranged to move in a substantially vertical plane within the coupler-head back of the knuckle, and means adapted to move the lower end of said piece rearwardly and to tip its upper end forwardly against the knuckle; substantially as described.

5. A coupler having a knuckle-lock, a lever lying without fixed pivot under the lock, trunnions thereon, guides for the trunnions, and means for moving the lever; substantially as described.

6. A coupler having a knuckle-lock, a lever lying without fixed pivot under the lock, trunnions thereon, guides for the trunnions, means for moving the lever, and a ledge upon which the lever is adapted to rise; substantially as described.

7. A coupler having a knuckle-lock, a lever without fixed pivot lying normally in a position approximating the horizontal under the lock, means for guiding it into an upright lock-lifting position, and an operating block or rod engaging a forked portion of the lever; substantially as described.

8. A coupler having a knuckle-lock and an opening-lever arranged to move in a substantially vertical plane, and having a shoulder adapted to engage and raise the lock, and having a nose adapted to engage the knuckle and move the same; substantially as described.

9. A coupler having a knuckle-lock and an opening-lever having a shoulder adapted to engage and raise the lock, and having a nose adapted to engage the knuckle and move the same, said lever being set without fixed pivot and having guides adapted to guide it toward an upright position and to permit it to be tipped; substantially as described.

10. A coupler having a knuckle, a lock carried thereby, a stop or shoulder on the knuckle adapted to restrain accidental lifting of the lock, and a lock-lifting device adapted to raise the lock, and adapted also to impart to it an independent tipping motion to clear it from the stop; substantially as described.

11. The combination with a coupler-head, of a coupler-knuckle, a sliding lock carried by the tail and having at its upper end a head, and a stop-shoulder on the coupler-head adapted to be engaged by the head of the lock; substantially as described.

12. The combination with the coupler-head and coupler-knuckle, of a lock carried by the tail and having a head, a stop-shoulder in the coupler-head adapted to be engaged by the head of the lock, and a second stop-shoulder in the coupler-head adapted to be engaged by the other end of the lock said lock being upwardly movable to raise the head out of engagement with its stop-shoulder; substantially as described.

13. A coupler having an upwardly-movable lock-raising device arranged within the coupling-head and adapted to raise the lock and to set it in raised position, and an operating-rod in engagement therewith, extending toward the side of the car and adapted to be moved to set or raise the lock; substantially as described.

14. A coupler having at the under side of the knuckle a knuckle-opening piece set obliquely to the line of the draw-bar, and in the direction of outward travel of the knuckle, said knuckle-opening piece being movable in a substantially vertical plane; substantially as described.

15. A coupler having a knuckle, a lock carried thereby and having a head and stop-shoulders in the coupler-head adapted to engage the head and the lower portion of the lock, said lock being vertically movable to clear its head and lower portion from the stop-shoulders; substantially as described.

16. A coupler-head having at its lower portion a lateral opening adapted to receive a sliding rod, and having upwardly-extending guiding-grooves adapted to guide a knuckle-opening device; substantially as described.

17. A coupler having a knuckle, a lock carried by the knuckle, an inclined surface on the coupler-head by which on the return of the knuckle the lock is raised, and a stop-shoulder situate in the coupler-head at a higher level than the incline above which stop-shoulder the lock is raised by the incline; substantially as described.

18. In a car-coupler the combination of a knuckle, a lock, a lock-lifting lever arranged without fixed pivot within the coupler-head and movable in a substantially vertical plane to raise the lock and set it in unlocked position, and a coupler-unlocking rod connected therewith and adapted to move the parts in reverse direction to unset the lock; substantially as described.

19. A coupler-knuckle having in its tail a vertical hole for carrying the lock, and having on the said tail a shoulder adapted to prevent upward jarring of the lock; substantially as described.

20. A coupler-knuckle having in its tail a vertical oblong hole for carrying the lock, and having on the said tail a shoulder adapted to prevent upward jarring of the lock; substantially as described.

21. A coupler having a knuckle, a vertically-movable lock carried thereby, a lever movable in a substantially vertical plane and adapted to raise the lock and to throw the knuckle, and means for holding the lever in an intermediate position to support the lock in lock-set position; substantially as described.

In testimony whereof I have hereunto set my hand.

JOHN WILLISON.

Witnesses:
O. K. BROOKS,
R. E. MILLER.